O. PAGAN.
Boiler-Tube Expander.

No. 160,699. Patented March 9, 1875.

Witnesses
S. J. Van Stavoren
J. P. Connolly

Inventor
Orestes Pagan
Connolly Bros
Attorneys

UNITED STATES PATENT OFFICE.

ORESTES PAGAN, OF PHILADELPHIA, PENNSYLVANIA.

IMPROVEMENT IN BOILER-TUBE EXPANDERS.

Specification forming part of Letters Patent No. 160,699, dated March 9, 1875; application filed December 28, 1874.

*To all whom it may concern:*

Be it known that I, ORESTES PAGAN, of Philadelphia, in the county of Philadelphia and State of Pennsylvania, have invented certain new and useful Improvements in Boiler-Tube Expanders; and I do hereby declare the following to be a full, clear, and exact description of the invention, such as will enable others skilled in the art to which it pertains to make and use it, reference being had to the accompanying drawings, which form part of this specification, in which—

Figure 1:
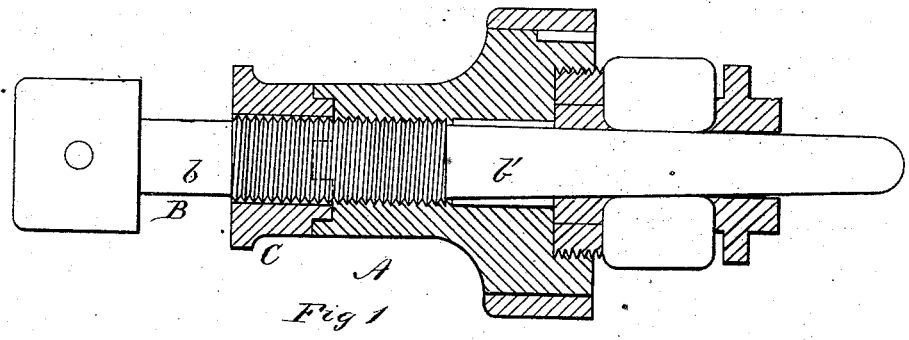
Figure 2:
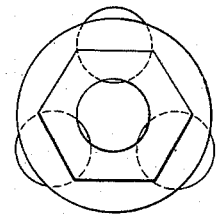
Figure 3:
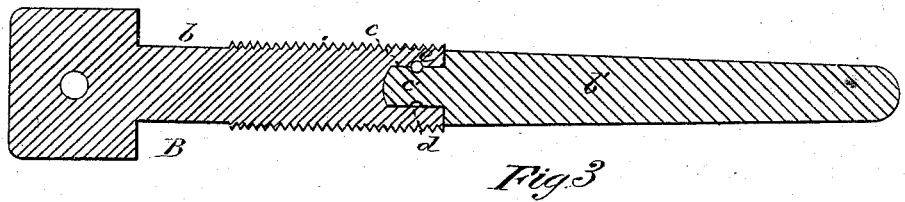
Figure 4:
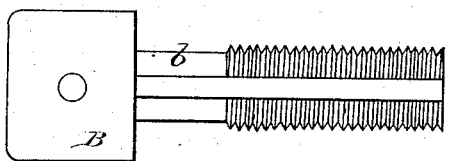
Figure 5:
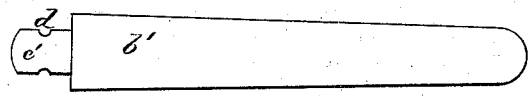

Figure 1 is a longitudinal vertical section of tool containing my improvements. Fig. 2 is an end view of same. Fig. 3 is a side elevation of mandrel. Fig. 4 is a side elevation of mandrel, showing parts detached.

The improvements herein described relate particularly to the tool for which Letters Patent of the United States, dated October 27, 1874, were granted to me and Thomas L. Ricart.

The object of the present improvements is twofold, and as follows: first, to so construct the mandrel that it may be readily changed for one of larger diameter, to be used upon tubes which have been already once expanded and require a second operation; second, to reduce the friction of the rolls upon the mandrel.

The improvements, then, consist in making the mandrel in two parts, dividing it transversely, so that the smooth tapering part may be removed from the threaded end, and another smooth section of larger diameter substituted for such removed part; and, also, in so uniting the smooth and threaded parts of the mandrel that while the latter remains stationary, or moving with the body, the former will revolve in the body, so as to present a rolling friction-surface for the rolls.

In the accompanying drawing, A represents a tool constructed substantially in accordance with the above-named patent, and B the mandrel thereof, embodying my present improvements. The mandrel B is made in two parts, $b$ and $b'$, the former cylindrical and threaded, the latter smooth and tapering. The part $b$ is formed with a socket, $c$, into which fits the journal $c'$ of the part $b'$. $d$ is an annular groove in the journal $c'$, and $e$ a pin passing through the part $b$, and fitting in said groove $d$, as shown.

By this means the parts $b$ and $b'$ are securely held together, while at the same time the latter is free to revolve when the former is held in engagement with the body A by means of the clutch at C.

The advantage of the foregoing improvements is as follows: When the clutch is in engagement with the body, and it is desired to turn the mandrel without advancing it, as fully described in the aforesaid patent, or to turn the body so as to revolve the rollers for smoothing purposes without causing them to expand, the mandrel will turn inside the rollers, thus presenting a rolling friction-surface to the latter. So, too, when it is desired to further expand tubes which have been once already expanded to the full limit of this tool, and where, under other circumstances, a new and larger tool would be required, this may be easily and readily effected by removing the smooth end of the mandrel and substituting therefor a like piece of greater diameter.

What I claim as my invention is—

1. The mandrel B of a boiler-tube-expanding tool, made in two parts, $b$ and $b'$, so as to permit the removal of the smooth from the threaded part, for the purpose specified.

2. A screw-threaded mandrel, B, of a boiler-expanding tube, having its smooth part connected with the threaded part, so that while the latter is held in engagement with the body, said smooth part is free to revolve, so as to present a rolling friction-surface for the rollers, substantially as shown and described.

In testimony that I claim the foregoing I have hereunto set my hand this 18th day of December, 1874.

ORESTES PAGAN.

Witnesses:
THOS. L. RICART,
M. DANL. CONNOLLY.